United States Patent

[11] 3,627,951

[72] Inventor Thomas Richard Batin
Liverpool, England
[21] Appl. No. 851,810
[22] Filed Aug. 21, 1969
[45] Patented Dec. 14, 1971
[73] Assignee The Plessey Company Limited
Ilford, Essex, England
[32] Priority Aug. 27, 1968
[33] Great Britain
[31] 40,914/68

[54] ASYNCHRONOUS COMMUNICATIONS SYSTEM CONTROLLED BY DATA PROCESSING DEVICE
4 Claims, 4 Drawing Figs.

[52] U.S. Cl. .......... 179/15 BA
[51] Int. Cl. .......... H04j 3/16
[50] Field of Search .......... 179/15 BA, 15 BY; 178/50

[56] References Cited
UNITED STATES PATENTS
3,475,560 10/1969 Kneisel et al. .......... 179/15 BA
3,296,377 1/1967 Sanden et al. .......... 179/15 BY

*Primary Examiner*—Kathleen H. Claffy
*Assistant Examiner*—Thomas W. Brown
*Attorney*—Scrivener, Parker, Scrivener and Clarke

ABSTRACT: A telephone switching system controlled by a data processing device in which the data processing device performs the switching function. Each calling line is allocated a slot on a large multichannel P.C.M. highway and an originating code is prefixed to each speech sample representing the identity of the circuit producing the sample. The complete composite data word is loaded via the single T.D.M. input highway onto the input of the real-time general purpose computer. The computer software provides sorting facilities to determine circuit identity and, via control programs, the identity of the samples destination. The originating code is replaced by the required destination code and the new composite data word is applied to a single T.D.M. output data highway. The output data highway is multiplied to all "line circuits" and each line circuit includes a comparator circuit which is activated when the prefix code corresponds to its own identity code. The activation of the comparator allows the associated speech sample to be passed to the associated line to reconstitute the speech.

ASYNCHRONOUS COMMUNICATIONS SYSTEM CONTROLLED BY DATA PROCESSING DEVICE

The present invention relates to communications systems such as automatic telephone systems in which the control of intercommunications for the passage of intelligence is effected by a centralized data processing device.

Electronic digital computers and data processing devices having large data-handling capacities giving high data-handling speeds with great reliability, are in extensive use. These equipments have reached such a stage of development and production that their cost is reasonable in relation to the facilities which they provide and serious consideration has been and is being given to their use in the field of centralized control of telephone-exchange switching systems and the like.

As applied to switching systems of the so-called space division type, involving switching networks comprising electromechanical or static switching devices, although the switching networks may vary in respect of trunking and their modes of control, the general approach to the utilization of a data processing device for centralized control purposes is to employ the device primarily for the actual setting up on a one-at-a-time basis of each physical connection between peripheral or line equipments (typically subscribers' line circuits) leaving the control of the maintenance and subsequent clearing of the connection outside the province of the central control device.

A space-division telephone switching network to which control by a data processing device is imminently applicable is for economic reasons generally of the multistage type, each stage comprising for example matrix switches say of the reed-crosspoint type. Inevitably the control of such a network by the more or less conventional methods outlined above incurs a variety of relatively complex processes such as network interrogation, route selection and the marking and operation of switching devices appropriate to the chosen route between the two peripheral devices concerned.

The present invention is motivated by a reappraisal of the requirements of an automatic telephone switching and similar systems and an assessment as to how the requirements might best be served by utilization of the known manipulative capabilities of data processing devices.

An object of the invention is to provide a telephone switching system or the like controlled by a data processing device in which the manipulative capabilities of the device are so advantageously used as to permit considerable simplification of the switching arrangements and control processes.

The present invention envisages an automatic telephone switching system or the like with central control by a data processing device and in which the techniques of time-division multiplex (T.D.M.) working and a simple form space-division switching are combined to advantage, and all intelligence for intercommunication between peripheral equipments is extended by way of the data processing device itself.

According to one aspect of the invention there is provided an automatic telephone switching system or the like in which all connections or lines to the exchange are individually terminated on line equipments all of which are connected to a common input data highway and a common output data highway, interposed between which is a data processing device, each said line equipment when activated being used to connect onto said input data highway a sample of the intelligence on the associated connection or line on a cyclic basis together with a coded origination address indicative of said line equipment and said data processing device is organized to pass said intelligence sample into said output data highway and to replace said coded origination address with a coded destination address indicative of the line equipment to which the intelligence sample is to be passed, each of said line equipments including a comparison device for comparing each destination address with the address allocated to that line equipment and a connection device arranged to pass said intelligence sample to the associated connection or line when said destination address and allocated address are equal.

The invention, together with its various aspects, will be more readily understood from the following description which should be read in conjunction with the accompanying drawings. Of the drawings:

FIG. 3 shows the logic diagram of the supervisory logic within a line equipment, while

Figure 1:
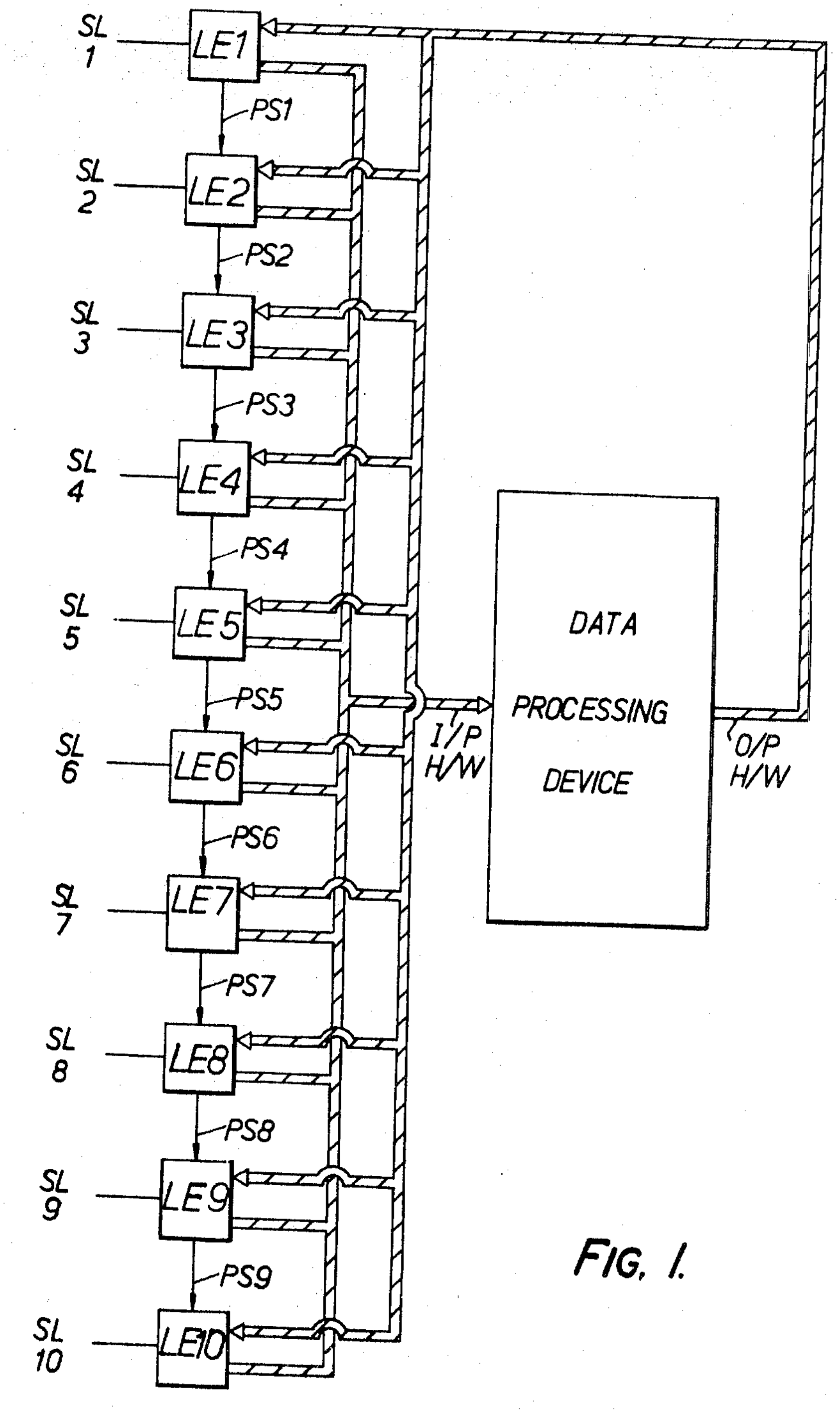
FIG. 1 shows in outline the fundamental principles of a telephone exchange or the like according to one embodiment of the invention.

Referring firstly to FIG. 1 it can be seen that each subscribers line, such as $SL_1$, is connected to an associated line equipment $LE_1$. All the line equipments of the exchange, of which only 10 are shown in FIG. 1, are served by two data processing device highways. The input highway I/P H/W connects the outputs of all the line equipments to the input of the central data processing device while the output highway O/P H/W connects the inputs of all the line equipments to the output of the central data processing device. The central data processing device may be a standard general purpose real-time computer programmed to handle telephone calls. Included in the data processing device is a main store used to store programs, working data and a "connection look-up table." The connection look-up table is organized such that one location is provided for each line equipment in the exchange and the originating address codes are used to define each location. Stored at each location in the look-up table is the address code of the other equipment involved in a "current connection."

Figure 2:
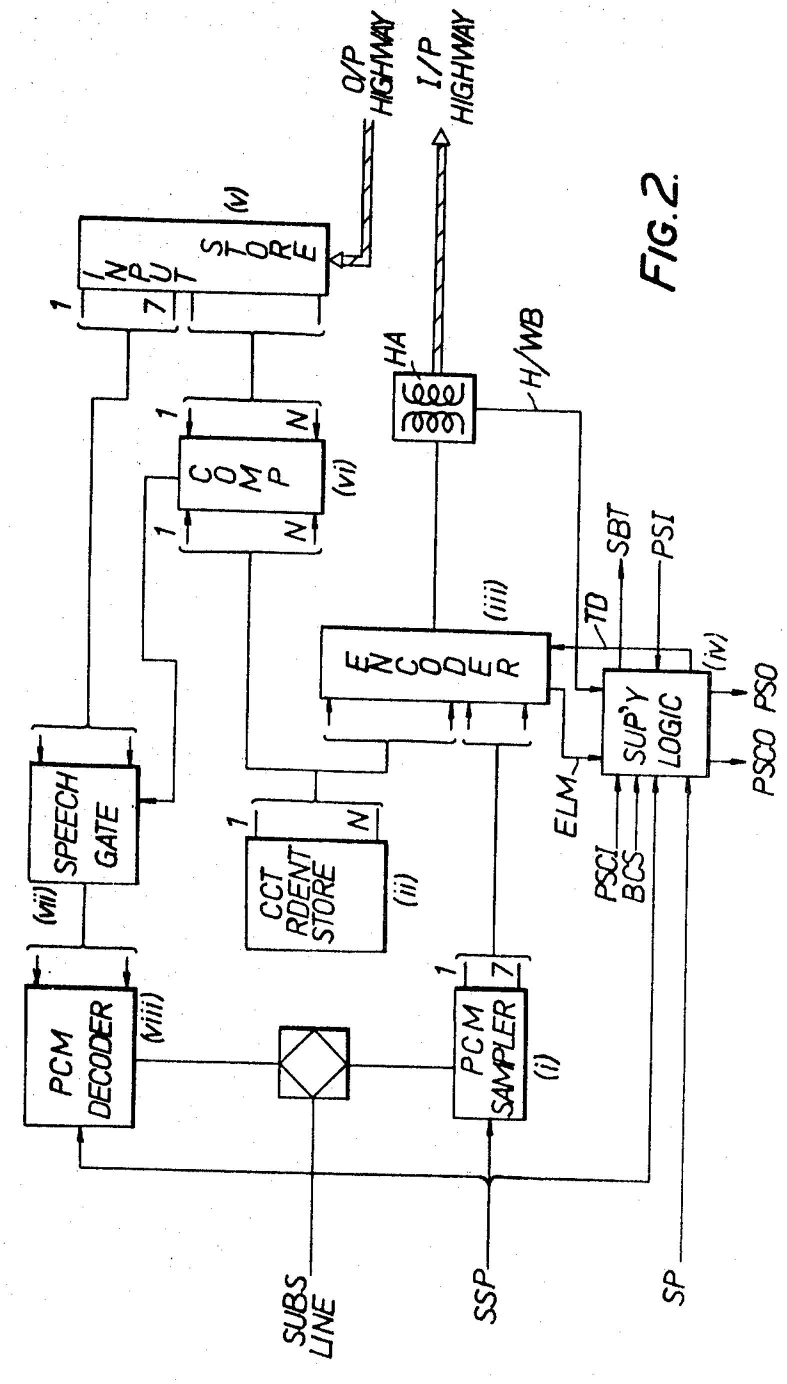
FIG. 2 shows a block diagram of a single line equipment of FIG. 1.

Each line equipment, as shown in FIG. 2 includes (i) a pulse code modulation sampler PCM SAMPLER, arranged to produce a seven bit binary code corresponding to a discrete speech sample taken from the associated line condition once every P.C.M. scanning cycle; (ii) a circuit identity store CCT IDENT STORE, arranged to generate a binary number indicative of the particular subscriber's line connected to that line equipment (i.e. the exchange number of that line equipment); (iii) an encoder ENCODER arranged to form once every P.C.M. scanning cycle one complete "line word" consisting of the circuit identity code together with the seven bit P.C.M. code and to store that line word until it is to be transmitted to the central data processing device over the input highway I/P HIGHWAY; (iv) supervisory logic SUP'Y LOGIC used to "-time" the connection of the line word to the input highway in priority order; (v) an input store INPUT STORE into which all line words are fed from the output highway O/P HIGHWAY; (vi) a comparator COMP arranged to compare the line identity code in the input store with the circuit identity code of the particular line equipment; (vii) a speech gate SPEECH GATE activated to pass the seven bit speech code from the input store when the comparator indicates that the line identity code and the circuit identity code are identical and (viii) a pulse code modulation decoder P.C.M. DECODER used to decode the seven bit P.C.M. sample on the output of the speech gate into the corresponding speech sample.

It can thus be seen that the present system of the invention differs from the prior art fundamentally by "attaching" to each P.C.M. speech sample a code indicative of the identity of the line originating that sample.

Referring back to FIG. 1 the complete line word (i.e. P.C.M. coded sample plus the originating circuit identity code) is loaded by way of the input data highway I/P H/W into the input of the real-time DATA PROCESSING DEVICE. The DATA PROCESSING DEVICE provides sorting facilities to determine circuit identity and, by way of control programs, the call destination code. The incoming line word is divided into its two constituent parts to isolate the seven bit P.C.M. speech sample from the originating circuit identity code. A new line word is then formed of the P.C.M. speech code plus the identity code of the "called" line equipment. The reassembled outgoing line word (i.e. P.C.M. code speech sample plus destination circuit identity code) is now transmitted by way of the output data highway O/P H/W to all the line equipments.

As mentioned previously each line equipment includes an input store and the outgoing line word is fed into this store in each of the line equipments of the exchange. Only one line equipment will be identified as the required destination by the comparator in that line equipment and the associated speech gate is activated allowing the P.C.M. decoder of the required destination line equipment to be activated. Thus the originating line equipment speech sample is reconstructed in the required subscribers line.

Once a subscribers line has been activated it is necessary to sample the state of that, and all other active lines, once every P.C.M. scan cycle. This may be performed by strobing all the P.C.M. samplers at the same time or in blocks. Typically the P.C.M. scanning rate is 8 kc./s. giving a 125 $\mu$ second period for transmitting all the originating line words appertaining to active lines. In FIG. 1 it will be seen that each line equipment is chained by priority signals PS1 to PS9. By this method "-calling" line equipments are connected for a "slot" period to the input data highway in "rotation." The slot arrangement of the input data highway is such that the number of simultaneous calls which can be handled (i.e. the number of slots in a 125 $\mu$ second period) is equivalent to the number required to handle the calls in the normal busy hour of the exchange there being less "slots" in a 125 $\mu$ second period than lines connected to the exchange. The priority signals are effective in the supervisory logic SUPY LOGIC which controls the "allocation" of the input data highway to the activated line equipment.

Figure 3:
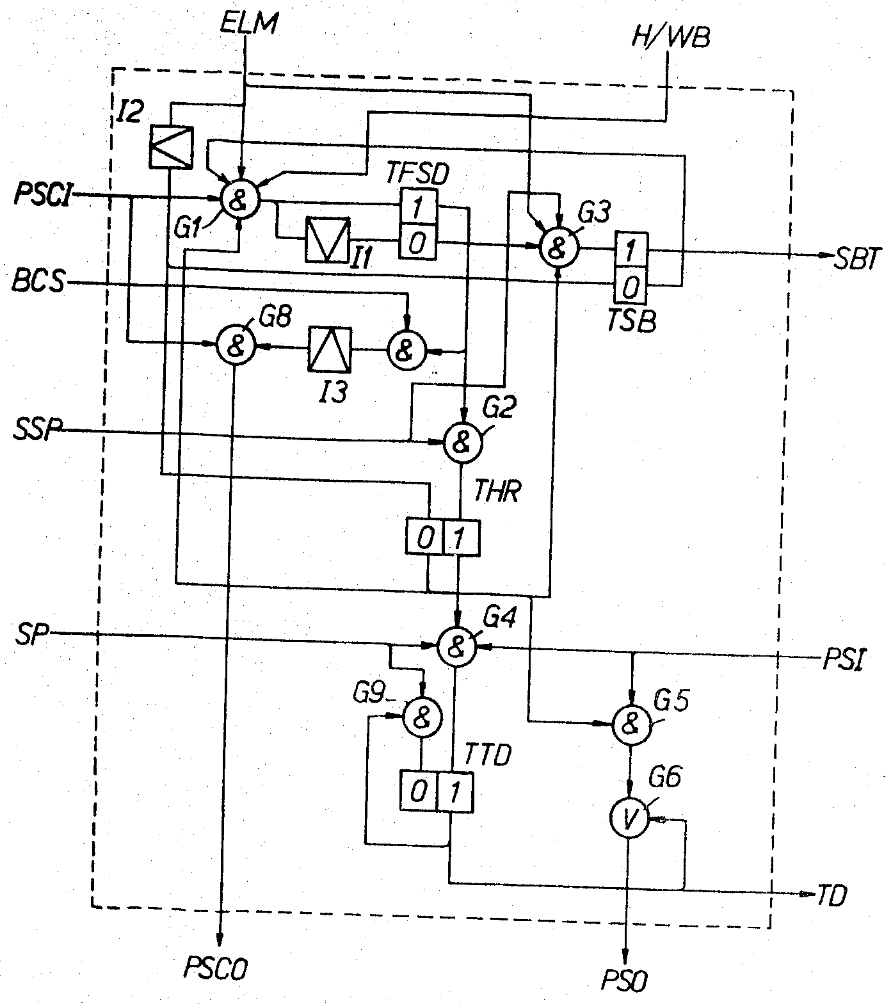

Referring now to FIG. 3, and later to FIG. 4, consideration will be given to the SUPY LOGIC in its function of connecting the output of the ENCODER in the line equipment to the input data highway I/P H/W. FIG. 3 shows a logic diagram including a number of AND gates, OR gates, inverters and toggles. Each AND gate, shown by and enclosed within the circle of the gate symbol, is arranged to produce a '1' state output when all its inputs are in the '1' state and a '0' state output when any one or more of its inputs are in the '0' state. Each OR gate, shown by V enclosed within the circle of the gate symbol, is arranged to produce a '1' state output when any one or more of its inputs are in the '1' state and a '0' state output when all its inputs are in the '0' state. Each inverter, such as $I_1$, is arranged to provide a '0' state output when its input is in the '1' state and a '1' state output when its input is in the '0' state while each toggle such as TFSD provides a '1' state output from its '1' side and a '0' state output from its '0' side when set by a '1' state input to its '1' side and a '0' state output from its '1' side with a '1' state output from its '0' side when reset by a '1' state input on its '0' side.

The supervisory logic is activated by the production of a '1' state signal on lead ELM. This lead ELM is the "encoder look-at-me" lead which is activated to the '1' state when the encoder receives the first P.C.M. sample of a call. This will occur coincident with a P.C.M. scan synchronization pulse SSP. In the idle state all the toggles of FIG. 3 are reset and at this stage it will be considered that the priority congestion signal PSCI is in the '1' state.

The activation of the "encoder look-at-me" lead ELM causes AND gate G1 to interrogate the high busy signal H/WB which is generated by the highway access circuit HA in FIG. 2. This latter circuit is arranged to produce a '0' state output on lead H/WB while the input data highway is occupied and a '1' state output when the highway is free. Hence gate $G_1$ will produce a '1' state output at the first available point in the 125 $\mu$ second cycle if any of the cycle is free. The '1' state output from gate $G_1$ causes the setting of the free "slot" detector toggle TFSD and this toggle will remain set for the rest of the particular scan cycle. At the end of the current P.C.M. scan time the next P.C.M. scan synchronizing pulse SSP will occur causing the setting of the highway required toggle THR, by way of AND-gate G2, if a free slot has been encountered or the setting of the send busy tone toggle TSB, by way of gate G3, if toggle TFSD was not set in the previous scan period (i.e. no free time available on the input data highway).

If toggle TSB is set this activates a common service supply of plant busy tone (not shown) which will be extended to the calling subscriber indicating that all the available slots on the input data highway are busy (i.e. highway fully occupied).

The setting of the highway required toggle THR establishes a demand on the input data highway for a slot period for the activated line equipment and this toggle remains set for the duration of the call. As mentioned previously the line equipments are connected in a priority chain and effectively this chain involves the transmit toggles TTD of all the activated line equipments. This priority chain is shown on the right-hand side in skeleton form in FIG. 4.

Figure 4:
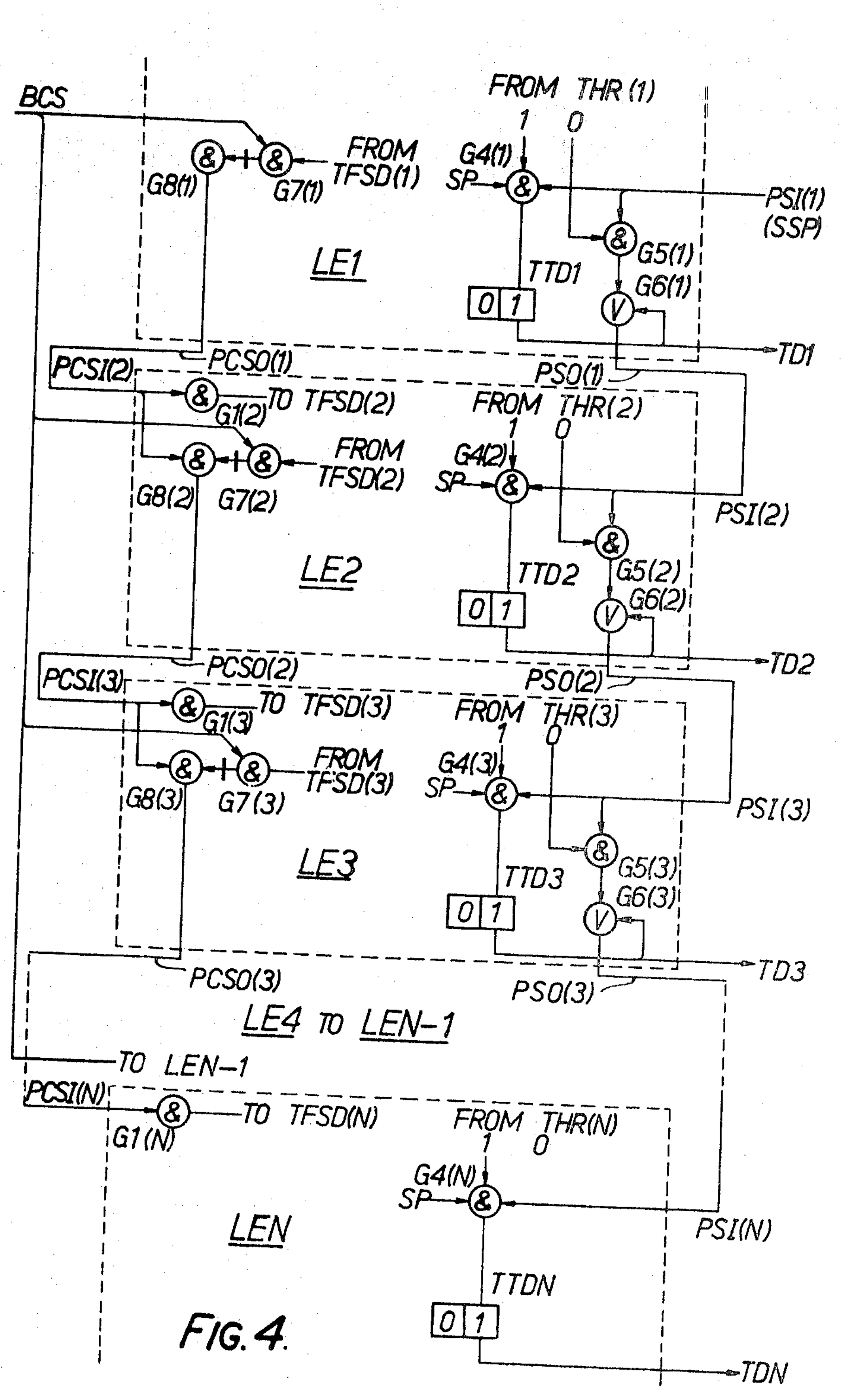
FIG. 4 shows the priority chaining arrangements for a number of line equipments.

Referring to FIG. 4 it can be seen that the priority-in signals PSI are connected to the priority-out signals PSO of the line equipment immediately above in priority order. The priority-in signal of the highest priority line equipment PSI (1) is connected to the scan synchronization pulse source (SSP). For explanatory purposes it will be assumed that line equipments $LE_1$ and $LE_3$ have been activated previously. Hence when a scan synchronization pulse occurs (i.e. at the start of a 125 $\mu$ second period) priority in signal PSI(1) will be activated to the '1' state. At this stage toggles THR(1) and THR(3) will be set while all other highway required toggles will be reset.

The generation of the scan synchronization pulse on lead PSI(2) causes the setting of the transmit toggle TTD1 by the "slot" pulse SP. This slot pulse defines the start of each slot within the 125 $\mu$ second scan period and its periodicity will be dependent upon the number of "slots" (i.e. line words) which are to be used to cater for the busy hour traffic of the exchange. The activation of the transmit toggle causes the production of the transmit data signal $TD_1$ to the encoder of the associated line equipment and the consequent transmission of the P.C.M. encoded speech sample and the circuit identity code of the line word. At the same time a priority-out signal on lead PSO(1) is generated and passed to the supervisory logic of the next line equipment in the priority chain. It was mentioned previously that line equipment LE2 was at this stage idle hence highway required toggle THR(2) will be reset allowing the priority in signal PSI(2) to bypass line equipment LE2 by activating gates G5(2) and G6(2) extending the priority signal to line equipment LE3.

Toggle THR(3) is at this stage set hence the priority signal PSI(3) will prime gate G4 (3) ready for the next (i.e. second) slot pulse SP. When this slot pulse occurs toggle TTD3 will be set while toggle TTD1 will be reset thus terminating the transmission of the line word from line equipment LE1 and commencing the transmission of the line word from line equipment LE2 and the extension of the priority signal to the lower priority line equipments, none of which are activated.

When the third slot pulse occurs toggle TTD3 will be reset and the rest of the scan cycle period will be idle.

It was mentioned previously that the setting of the highway required toggle in the supervisory logic is under the control of a scan cycle synchronization pulse hence at the start of any scan cycle period the number of slots required can be defined by the number of highway required toggles set.

The setting of toggle THR(2) in FIG. 4 causes the closure of the priority signal bypass logic, by inhibiting AND-gate G5(2) and allows the transmission of the line word from line equipment LE2 in the second slot period "pushing" the transmission of the line word from line equipment LE3 into the third slot. By this system of priority chaining it is ensured that the slots of a scan cycle period are filled up from the start of this period accumulating the "free" slots at the latter part of the 125 $\mu$ second scan cycle period. This arrangement is of particular value in light traffic periods allowing the data processing device to "switch" to nontelephone programs in its spare time.

It will be seen from reference to both FIGS. 3 and 4 that a further priority chaining system is included in the supervisory logic of a line equipment. This chaining involves signals PSCI (Priority-in signal on congestion) PSCO (priority signal-out on congestion) and signal BCS (the busy congestion signal). This chaining is used when only a single slot remains on the input data highway and is provided to prevent more than one highway required toggle from being set in any one cycle. Signal BCS is activated when only one slot remains and the setting of a free slot detected toggle TFSD causes the inhibiting of all lower priority free slot detected toggles by inhibiting the free slot detection gates over lead PSCO.

When the call is complete or abandoned the "encoder look-at-me" signal will be switched back to the '0' state causing the resetting of the associated highway required toggle.

Consideration will now be given to the processing of a call by the exchange of the invention.

When a line equipment is idle the ENCODER is completely empty and the associated SUPY LOGIC is reset. The looping of the line by a calling subscriber's instrument has no instantaneous effect on the line equipment until the next P.C.M. scan synchronization pulse occurs.

1. Call origination detection

When the next P.C.M. synchronization pulse occurs the off-hook line condition will be strobed into the encoder along with the address of the line equipment. At this time the encoder will raise a "look-at-me" signal ELM which conditions the line equipment supervisory logic SUPY LOGIC to interrogate the computer input highway to see if there is any free channels (or slots) available. This interrogation process takes one complete P.C.M. scan time (i.e. 125 $\mu$ seconds).

2. Request for and connection to I/P Highway a. If a free slot is detected in the previous P.C.M. scan cycle the highway required toggle THR in the SUPY LOGIC is set.

b. If no free slots are detected in the previous P.C.M. scan time the highway is fully occupied and plant busy tone is returned to the calling subscriber. (This will be returned between 125 $\mu$ seconds and 250 $\mu$ seconds after the line loop condition occurs). The SUPY LOGIC locks to the busy tone condition until the associated subscribers line is broken (i.e. calling subscriber abandons the call).

The highway required toggle THR, when set at the start of a new scan cycle period, inhibits the highway interrogation logic and "places" the associated transmit toggle TTD in the priority queue at a position defined by the line equipment's priority position in the exchange in relationship to the other "active" line equipments.

When the transmit toggle TTD reaches the top of the queue it is set, for a slot period, thereby activating the output of the encoder allowing the contents of the encoder (i.e. P.C.M. sample of the looped line condition + the address code of the line equipment) to be passed onto the input data highway. At the end of the slot the transmit toggle will be reset; however, the highway required toggle remains set for the next and all subsequent P.C.M. scan cycle periods of the call. It should be noted that the first sample transmitted to the line will be that sample taken between 125 and 375 $\mu$ seconds after the origination of the off hook condition.

Additionally it is necessary to protect against a number of calls being originated in any one 125 $\mu$ second period when a limited number of slots are free on the input highway. This may be performed by chaining the highway interrogation logic in the same priority manner as the transmit toggles and activating an inhibit condition to lower priority line equipments when only one slot remains.

4. Highway slot allocated

Subsequent P.C.M. samples will be transmitted to the input highway, under the control of the transmit toggle, in the first available slot allocated in accordance with the priority rating of the line equipment in relationship to the other line equipments in use and not in the same slot each cycle. This arrangement ensures full occupancy of the early slots in an input data highway I/P H/W cycle leaving later slots for other program processing if required.

5. Dialling-in and "connection" testing

After a nominal number of P.C.M. scans have been received by the computer the dialling-in program will be activated and subsequent P.C.M. samples will carry the dialling pulses. To perform the operation of impulse decoding it is necessary to store each incoming sample and to process a batch of samples to "decode" the dialed information. Typically the "dialing-in" program is to be arranged such that the storage location corresponding to the originating address of the new call in the connection look-up table has written into it the address of a "register." The "register" being a block of words of storage used to count the number of "make" and "break" conditions received from the line and to decode these conditions into the directory number of the wanted subscriber. Ultimately it can be seen that the dialed information will be assembled in the "register." When the end of dialing is sensed the stored directory number in the "register" will be used to address a preprogrammed store to define the address code of the line equipment to which "connection" is required. The so defined destination code will be over-written into the "connection look-up" table section of the main store in the data processing device at an address defined by the originating address. Each location in the connection look-up table of the core store includes two sections, one indicating the equipment involved in the connection (i.e. register or the like or the destination address) and the other holding a code indicating the current operation program and it's sequence control number.

The computer now enters its busy test program which simply addresses the "connection look-up table" with the destination code to see if the called line equipment is free. If the called line equipment is free the address of the calling line equipment is written into the addressed location of the connection look-up table.

a. Called equipment free

The computer now extends onto the output highway, in any free slot the address of the calling line equipment, together with (i) a succession of codes indicative of ring tone or (ii) a succession of codes which, when decoded by the P.C.M. decoder in the originating line equipment, generates ring tone in the calling subscribers line equipment.

The alternatives (i) and (ii) above depend upon (i) the provision of tone supervisory equipment in the line equipment or (ii) the program generation of supervisory tones.

Additionally the computer extends, in a further free slot, the address code of the called subscribers line equipment together with (i) a succession of codes which when decoded by the P.C.M. decoder in the destination line equipment generates ringing or (ii) a succession of codes which, when decoded, activate a ringing device at the subscribers instrument.

Similar alternative arrangements apply as mentioned above for alternatives (i) and (ii).

The above mentioned situation regarding ring-tone and ringing will persist until the called sub. answers the call.

b. Called sub. busy.

In this case the computer will extend on to the output highway, in any free time slot the address code of the calling line equipment together with (i) a succession of codes indicative of busy tone or (ii) a succession of codes which, when decoded by the P.C.M. decoder in the originating line equipment, generate busy tone in the calling line. Alternatives (i) and (ii) were explained above.

6. (ai) Called sub answers.

Ultimately the called subscriber will "lift-off" causing similar steps to 1, 2, 3 and 4 above to be performed. The computer however is conditioned to allocate the "call connection" program to the call by so tagging the program and sequence control number section of the location in the look-up table corresponding to the originating address code of the called line equipment. The call connection program terminates the ring tone and ringing signals and tags both the locations of the called and calling line equipments in the connection look-up table in the program and sequence control number sections with information indicating that the call is set up.

At this point metering information will be produced defining the time of day, the calling and called parties directory numbers and the date together with the tariff rate. This information will be held in a metering section of the main store for the duration of the call.

6. (aii) Called sub. unavailable

As with any standard telephone system the ringing/ring tone generation methods of above will be produced until either the called subscriber answers (6ai) or the calling subscriber abandons the call. The latter part of the busy test program is arranged to monitor the calling line and if it detects an abandoned condition the extension of ringing and ring tone is terminated and the connection look-up table is restored to zero.

7. Call in progress

Once the call has been established the program sections of the relevant locations in the look-up store will be set to the communication mode causing the originating address of a P.C.M. sample to be converted into the required destination address.

8. Call complete

While the call is in progress a disconnection program checks the appearance of the calling and called parties originating address codes. If one originating code disappears the disconnection program detects this and clears the look-up table against both parties. It should be noted that if either party is slow in releasing a park condition may be used by the computer sending a call release code which effectively disconnects the calling or called parties line equipment for a defined duration. This facility ensures that highway slot time is only taken by call-set-up or conversations. It also can be used to simplify the line seize logic.

When the call is complete the time of day together with the calling and called subscriber's address codes will be written into the meter-file for processing at some future time (e.g. once every 24 hours in slack telephone usage periods).

From the above it can be seen that the system of the invention provides for the handling of telephone calls by a central data processing device served by two T.D.M. type highways, synchronization between highways being provided by attaching address codes defining (a) the line equipment originating the P.C.M. sample (input data highway) and (b) the line equipment to which the sample is to be "connected." The particular organization of the input highway occupancy allows the utilization of the data processing device for other nontelephone switching tasks in the slack telephone call periods of the day if a general purpose computer is used and arrangements can be provided for telephone subscriber access to nontelephone programs in the computer by allocating selected dialed codes to computer peripheral equipment. Additionally the use of the data processing device to administer the call makes the system eminently suitable for the incorporation of such facilities as call transfer, alternative routing and short code dialing using simple programing techniques.

Alternative arrangements to those shown above will be seen by those skilled in the art. For example the priority system of line equipment chaining may be replaced by a scanning system arranged to scan marked line equipments, while the outline arrangements described above for the programing of the telephone switching functions may be extensively modified without going outside the fundamentals of the invention. Additionally a centralized P.C.M. scanner or a number of scanners may be provided at the input end of the input data highway and a centralized P.C.M. decoder or a number of decoders may be provided common to all or a number of line equipments. Also the system may be modified by the provision of a common destination address decoder whose output directs over a simple switching network the passage of the speech sample into the required line equipment, in place of the individual comparators described above.

What we claim is:

1. An automatic telecommunication switching system comprising a plurality of line equipments each having input and output paths and each having means arranged when activated to periodically interrogate the intelligence on an associated telecommunication line to produce for each interrogation a line word comprising a corresponding coded sample of said intelligence together with a coded origination address indicative of the identity of the particular line equipment for application to said output path and each said line equipment when activated includes further means arranged to connect to the associated telecommunication line an intelligence sample corresponding to a coded sample of a line word experienced at said input path when the coded destination address thereof indicates the identity of the particular line equipment; and, a common input highway having first and second ends, said first end being connected sequentially (one at a time) on a cyclic basis to the output path from each of said activated line equipments to receive therefrom the coded samples and coded originations address, a common output highway having first and second ends, said second end being connected to the input path of all said line equipments and a data processing device connecting said second end of said common input highway to said first end of said common output highway and said data processing device is organized to pass each coded sample applied to said common input highway to said common output highway and to replace the coded origination address accompanying each sample with a coded destination address indicative of the line equipment to which the intelligence sample is to be passed.

2. An automatic telecommunication switching system according to claim 1, wherein each said line equipment also includes a supervisory logic means arranged to detect a free slot on said input highway and to produce a timed activation signal which controls the connection of said output path to said first end of said common input highway at the start of said free slot and all said supervisory logic means are connected in a priority chain in such manner that the slots of a highway cycle are taken into use progressively starting with the first slot of a cycle in accordance with the number of separate line words to be transmitted in any one cycle.

3. An automatic telecommunication switching system according to claim 2, wherein each said line equipment additionally includes a pulse code modulation sampling device arranged when activated to cyclically sample the intelligence in the associated telecommunication line to produce a pulse code modulation sample therefrom, a register arranged to temporarily store each sample and to form a line word for transmission over the output path of the line equipment and a circuit identity store arranged to hold the coded origination address indicative of the particular line equipment.

4. An automatic telecommunication switching system according to claim 3 wherein each said line equipment further includes a comparison device for comparing each destination address on said common output highway with the address in said circuit identity store, a pulse code modulation decoder connected to said associated telecommunication line and a connection device arranged to pass an intelligence sample to said pulse code modulation decoder when the destination address accompanying said sample equates to that held in said circuit identity store.

* * * * *